Figure 14:
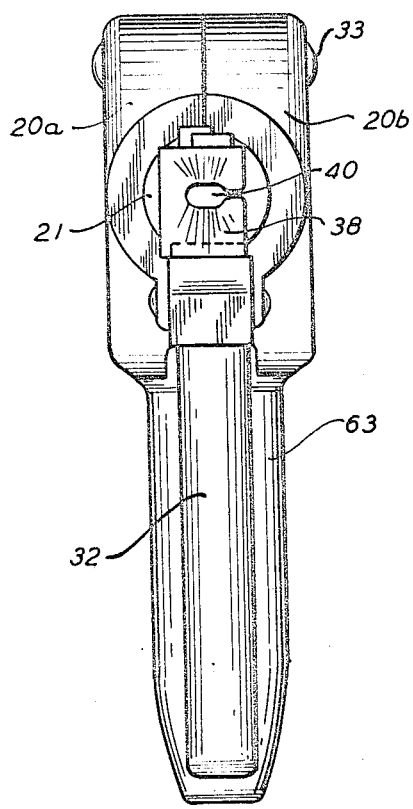

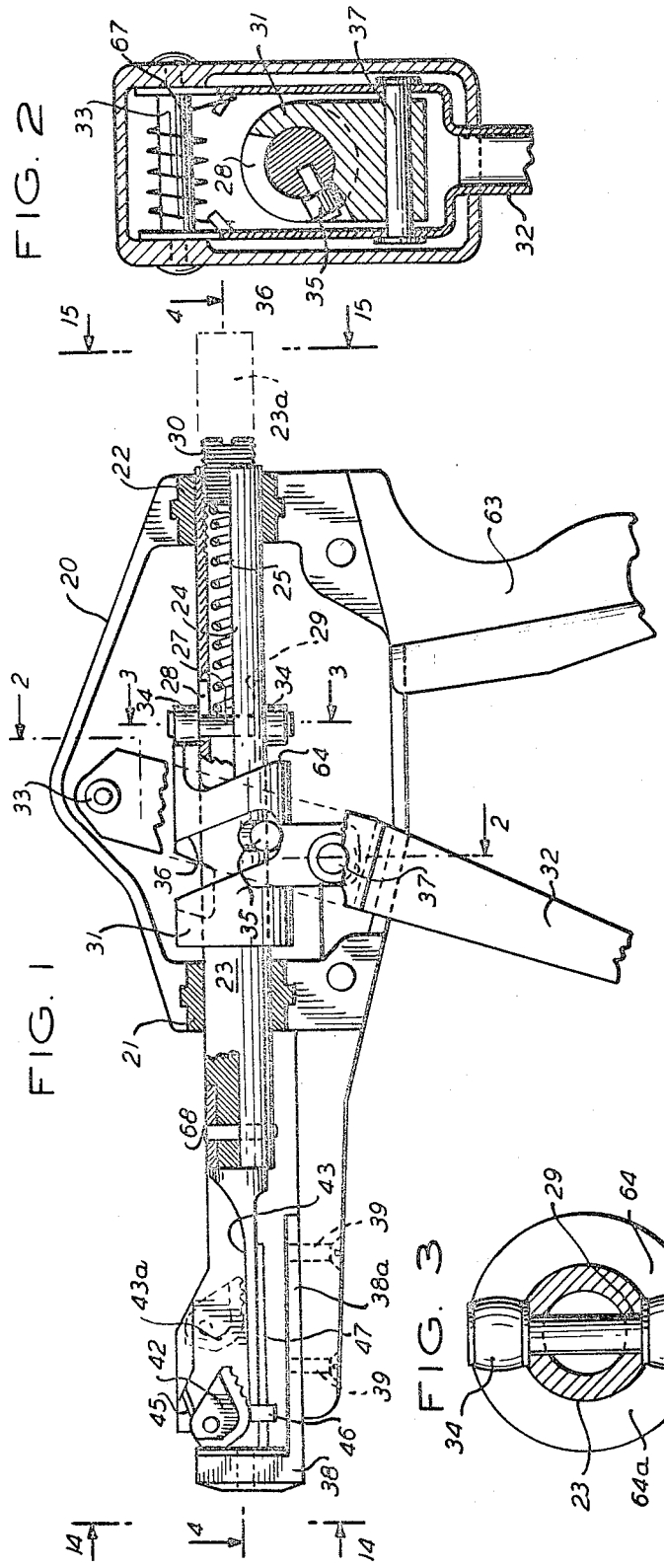

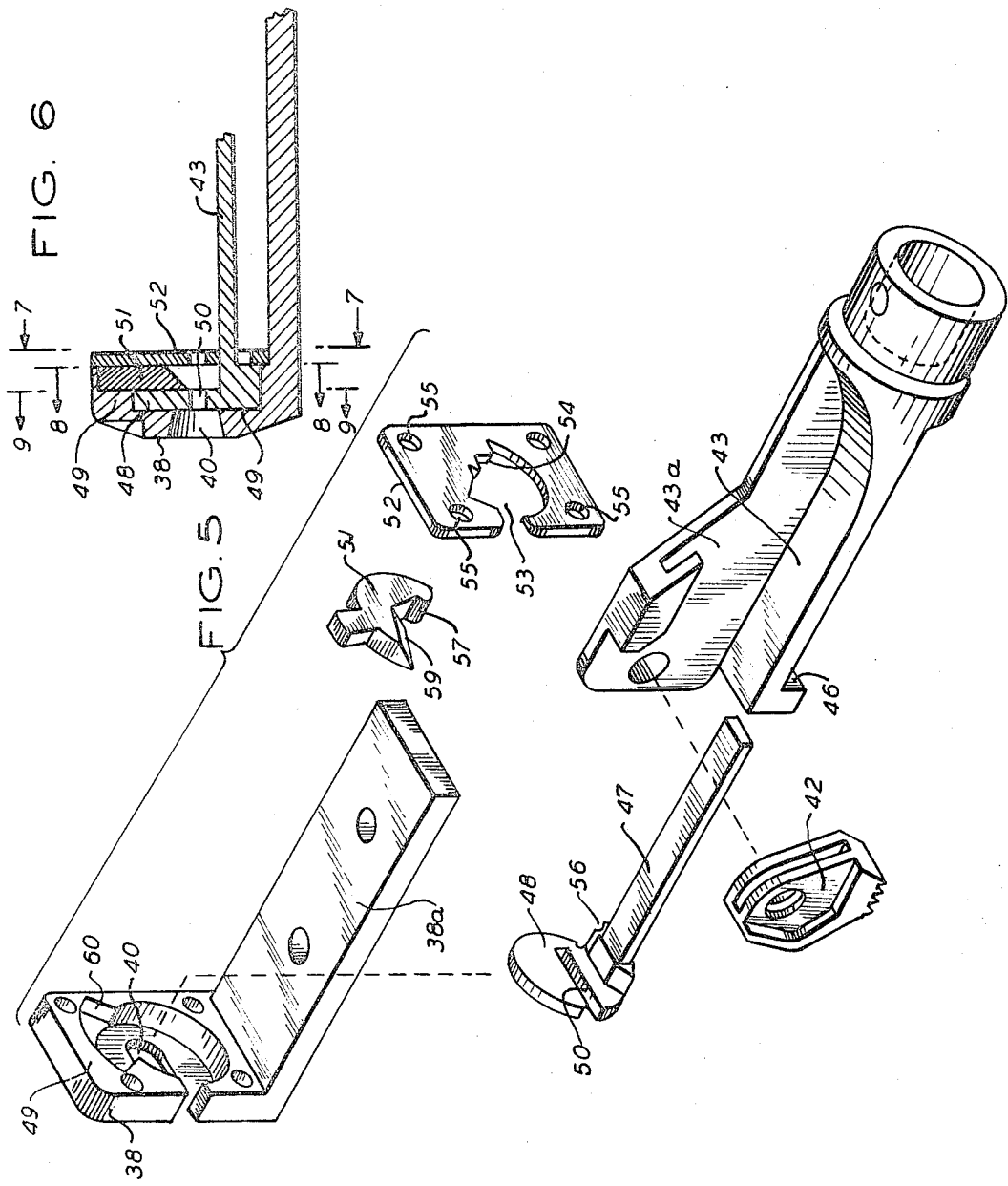

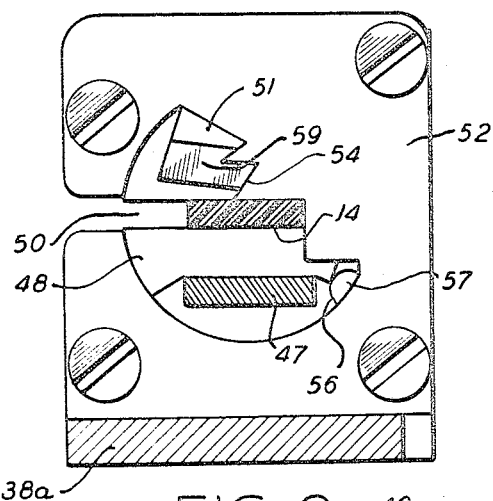
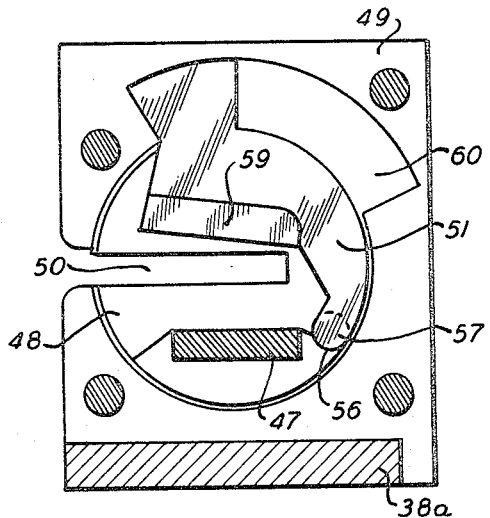
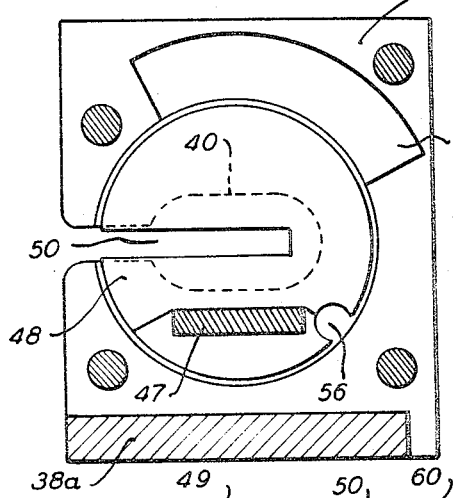
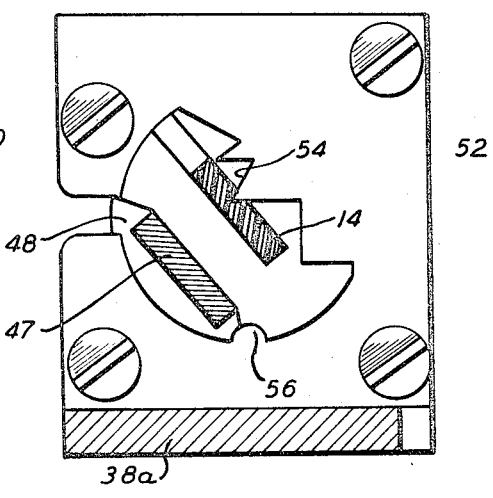
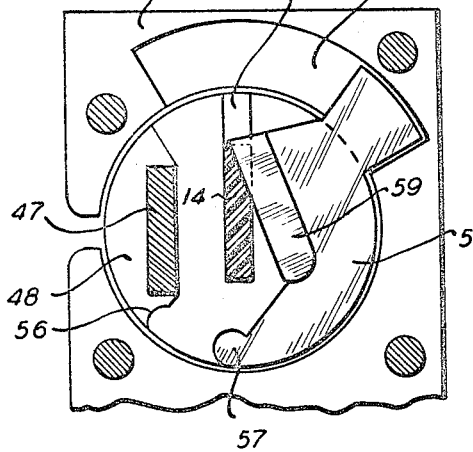

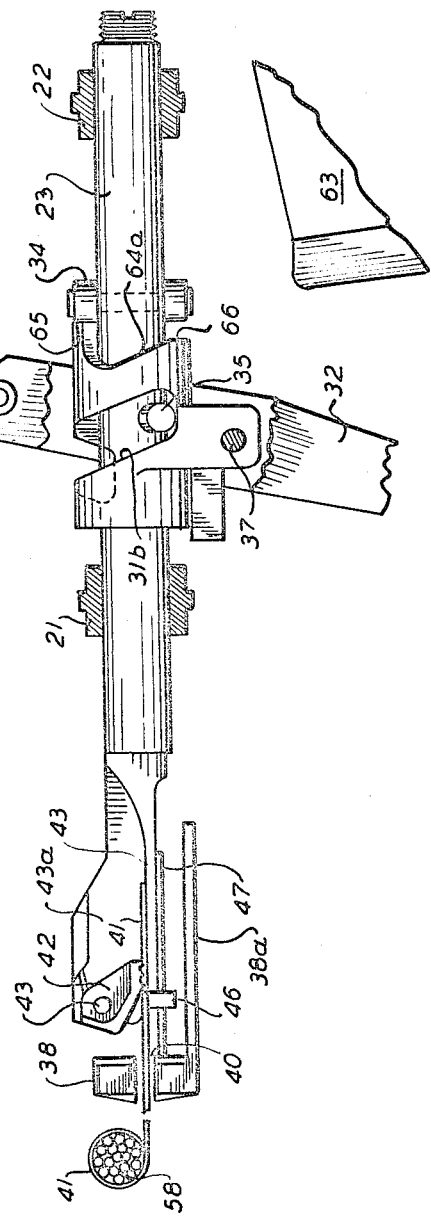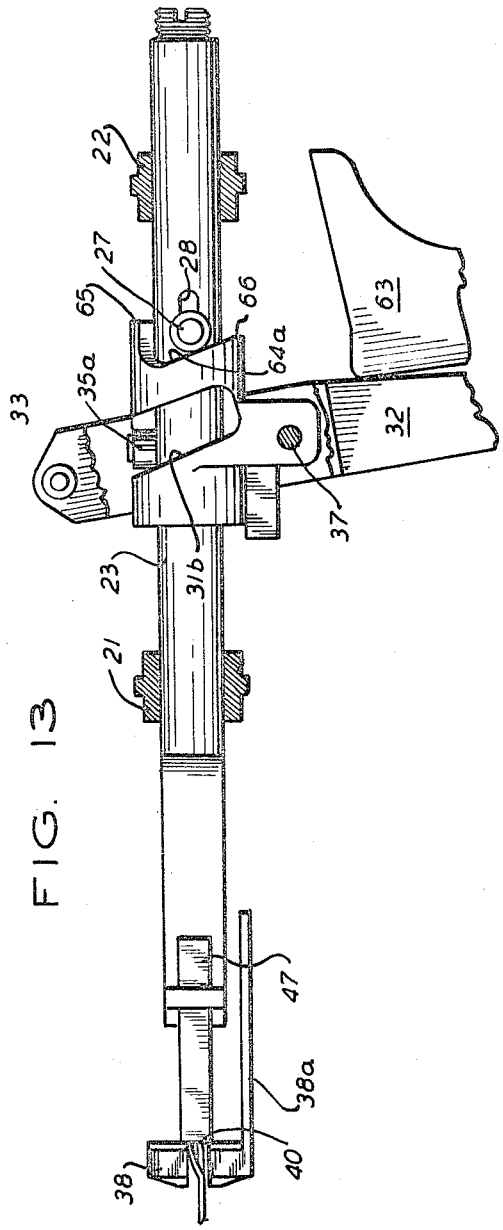

July 25, 1967  G. R. LAWSON ETAL  3,332,454

TOOL

Filed Feb. 24, 1965  5 Sheets-Sheet 5

INVENTOR.
G. R. LAWSON
D. EPPLER & H. J. BUSH
BY
Harry Brunner
ATTORNEY 3,332,454
TOOL
Gustaf R. Lawson, Somerset, Daniel Eppler, Nutley, and Harold J. Bush, Matawan, N.J., assignors to The Thomas & Betts Co., Elizabeth, N.J., a corporation of New Jersey
Filed Feb. 24, 1965, Ser. No. 434,864
17 Claims. (Cl. 140—93.2)

This invention relates to a tool for use in connection with a strap to be moved by the tool to a predetermined point. The tool is adapted for tightening the strap around a wire or bundle of wires while drawing it through the tool to a predetermined tension point.

A further feature of the invention is to provide a tool such as above noted, wherein the strap so drawn under predetermined tension is then automatically rotated. A further feature of the invention is to provide a tool wherein the strap is automatically cut after having been so rotated.

A further feature of the invention is the provision of a tool having novel means for adjusting the degree of tension to be imposed on the strap in drawing it through the tool.

A further feature of the invention is to provide a novel means in the tool for impaling the strap and for cutting it in a smooth, effective manner.

The drawings, illustrating procedures and devices useful in carrying out the invention, and the description below, are exemplary only of the invention, which shall be deemed to cover all other devices and procedures coming within the scope and purview of the appended claims.

Figure 15:
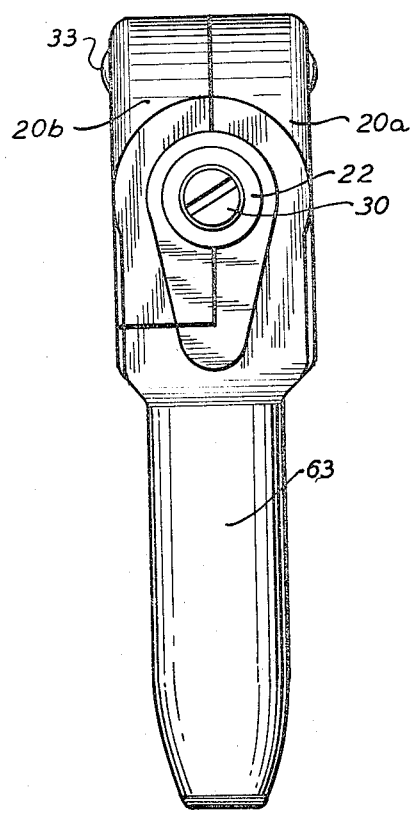
Figure 16:
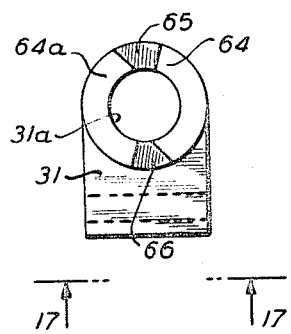
Figure 17:
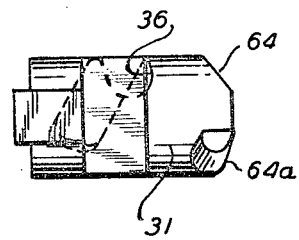

In the drawings, wherein similar reference characters indicate like parts:

FIG. 1 is a side elevational, partly fragmentary and sectional view of a tool embodying the invention, FIG. 2 is a fragmentary sectional view taken at line 2—2 of FIG. 1, FIG. 3 is an enlarged fragmentary, sectional, view, taken at line 3—3 of FIG. 1, FIG. 4 is a longitudinal, partly sectional view, taken at line 4—4 of FIG. 1, FIG. 5 is an exploded, perspective view of parts of the tool, FIG. 6 is a vertical sectional assembly view of parts shown in FIG. 5, FIG. 7 is an enlarged vertical, sectional view, taken at line 7—7 of FIG. 6, FIG. 8 is an enlarged vertical sectional view, taken at line 8—8 of FIG. 6, FIG. 9 is an enlarged vertical sectional view, taken at line 9—9 of FIG. 6, FIGS. 10 and 11 are views similar to FIGS. 7 and 8, respectively, but showing the position of the parts on rotation of shaft 23 in the operation of the tool, FIG. 12 is a fragmentary sectional view, showing the position of the parts in the initiation of the operation of drawing the strap into the tool, FIG. 13 is a similar view, showing parts rotated for the cutting operation, FIG. 14 is a front end elevational view of the tool taken at line 14—14 of FIG. 1, FIG. 15 is a rear end elevational view taken at line 15—15 of FIG. 1, FIG. 16 is an end elevational view of cam member 31 and FIG. 17 is a bottom plan view thereof, taken at line 17—17 of FIG. 16.

As shown in the drawings, the device of this invention comprising a housing 20 which may conveniently be formed of two or more parts such as 20a, 20b (FIG. 14) suitably secured together and having bearings therein 21, 22 (FIG. 12), for slidably and rotatably receiving shaft 23. The shaft 23 may be hollow as noted at 24 (FIG. 1) to receive a spring 25, which bears at one end against a pin 27. The pin 27 bears against one end of a cam element 31 and is movably positioned in slots 28, 29 in shaft 23 for limited axial sliding movement.

A spring adjusting stud 30 is positioned in one end of the shaft 23. By adjusting the position of the spring adjusting stud 30 in the shaft, the tension exerted by the spring 25 on the pin 27 and in turn by said pin on cam element 31, may be adjusted to determine the point at which continued movement of the cam element 31 with shaft 23 on movement of handle 32 toward a fixed handle 63, will be resisted by the spring 25, causing shaft 23 to rotate (FIG. 13). The cam member 31 (FIG. 16) is internally axially apertured (as at 31a) to fully slidably receive the shaft 23. Pin 35 (FIG. 1) which may have antifriction rollers 35a (FIG. 13) passes through shaft 23 and extends (FIG. 12) into cam slot 31b in cam element 31, which is non-rotatably but axially movable by means of a connection movably connected to handle 32 at 37 (FIG. 1). The end of cam member 31 is formed with a cam surface 64 and with flat portions 65, 66, 180° apart (FIG. 16).

A slotted registration plate 38 (FIGS. 5, 1) is secured to the tool as by a pin or pins or rivets 39 passing through an extended arm 38a of plate 38 (FIG. 1). Said registration plate is provided with a slot 40 for orienting the strap 41 in the tool.

A pawl 42 engages the strap and presses the same against an extended plate portion 43 (FIGS. 5 and 1) of or secured to shaft 23. The pawl 42 is pivotally connected to an upstanding wall portion 43a of the plate 43; spring 45 (FIGS. 1 and 4) normally urges the pawl into engagement with the strap, to carry the strap along with the shaft 23 during movement of the handle 32 by the operator in one (closing) direction in operation of the tool; on movement of handle 32 in the return direction, due to a return spring 67 (FIG. 2) or other means for the purpose, the pawl lifts and slides over the strap.

Plate 43 is fixed to shaft 23 as at 68 (FIG. 1) and is downturned as at 46 and slotted to slidably receive elongated plate 47 of a slotted twister head 48 which is provided with a slot 50, through which the strap 41 passes. The head 48 (FIG. 6) is positioned in a recessed or shouldered portion 49 of the registration plate 38.

A knife blade 51 (FIGS. 5, 6) is freely rotatably positioned between the twister head 48 and a knife plate or cutter head 52, the latter having an enlarged slot 53 for passage of the strap therethrough for rotation into engagement with a serrated edge 54 of cutter head 52. The latter is secured to registration plate 38; the twister head 48 and knife blade 51 are positioned between members 38 and 52. Fastening means passing through apertures 55 in the plate 52 engage the registration plate 38. The twister head 48 and knife 51 are provided with complementary means, such as the recess 56 in the twister head and a complementary registration protuberance 57 on the knife 51 for a purpose presently explained.

In operation of the device, the strap 41 is looped around a bundle of wires or other objects 58 (FIG. 12) to be tied thereby, and the free end of the strap positioned in the tool and between pawl 42 and plate 43.

*Operation of the tool*

In operation the strap is inserted through the members 38, 48, 52 and under the pawl 42, being then held by the latter against the portion 43 of shaft 23 (FIG. 12). On movement of the handle 32 toward fixed handle 63 (FIG. 13) the strap is drawn into the tool; on release of handle 32 the spring 67 (FIG. 2) returns the handle 32 to the left, moving cam element 31 and thus (through pin 35) moving shaft 23 to the left. Pawl 42 lifts freely over the strap to restore the tool parts to their original position with the strap partly within the tool. The strap is progressively moved into the tool by repeating the above operation, until the resistance of the strap against being further drawn into the tool is greater than the tension exerted by spring 25 against the pin 27. Further movement of handle 32 toward handle 63 will now result in rotation of shaft 23 and thus also the plate 47; the twister head 48 of plate 47 will rotate the strap 41 from its initial position (FIG. 12) to a position against the cutting edge 59 of knife blade 51 (FIG. 13). During the described operation and as shown in FIGS. 7–11, the strap engages and moves the knife blade 51 until the latter abuts the stop portion 60 of the registration plate 38 FIG. 11. Continued rotation of the shaft and the twister 48 will then result in cutting the strap against the blade 59. The described initial engagement of the strap with the serrated edge 54 of plate 52 impales the strap and holds it in position while it is pressed against the cutting edge 59 of knife 51. On return of the shaft to its original position the twister head 48 is rotated counterclockwise (viewing it from the FIG. 5 position) and the blade 51 is returned to its original position on engagement of recessed portion 56 (FIG. 5) of the twister head and plate (48, 47) with the registration protuberance 57 of the knife 51.

It will be noted (FIG. 16) that the cam element 31 has the cam surfaces 64, 64a engaging the rollers 34 on pin 27 fixed to shaft 23 in the strap turning and cutting operation above described. At the initiation of that operation the cam 31 urged against rollers 34 first contacts the rollers with the flat portions 65, 66 of the cam. As these flat portions are just past the centers of the rollers the rollers rotate the cam element 31 to present the cam surfaces 64, 64a for engagement by the rollers for turning the shaft for the strap turning and cutting procedure.

While the foregoing disclosure of an exemplary embodiment is made in accordance with the patent statutes, it is to be understood that the invention is not limited thereto or thereby, the inventive scope being defined in the appended claims.

We claim:

1. In a tool for use in connection with a strap to be drawn into the tool, a tool housings, an elongated shaft journalled in said housing for axial and rotary movement therein, means for securing the strap to the shaft, a cam member slidably disposed in the housing relative to the shaft, means movably secured to the housing engaging the cam member and shaft for axial movement of the shaft to a predetermined point and for rotation of said shaft beyond said point; thus rotating the strap therewith.

2. In a tool for use in connection with a strap to be drawn into the tool as set forth in claim 1, means resisting movement of said shaft beyond said predetermined point.

3. In a tool for use in connection with a strap to be drawn into the tool as set forth in claim 1, said cam member having an aperture therethrough slidably receiving the shaft to so slidably dispose the cam member in the housing.

4. In a tool for use in connection with a strap to be drawn into the tool as set forth in claim 1, said means movably secured to the housing comprising a handle member pivotally connected to the housing, and means connecting the handle member and cam member.

5. In a tool for use in connection with a strap to be drawn into the tool as set forth in claim 2, said means resisting movement of the shaft beyond said predetermined point comprising spring means engaging said shaft and cam member.

6. In a tool for use in connection with a strap to be drawn into the tool as set forth in claim 5, means engaging said spring and shaft to adjust the force exerted by the spring and thus adjust the said predetermined point.

7. In a tool for use in connection with a strap to be drawn into the tool as set forth in claim 1, a pawl pivotally mounted on the shaft, engaging the strap for so securing the strap to the shaft.

8. In a tool for use in connection with a strap to be drawn into the tool as set forth in claim 1, a slotted registration plate on the housing for passage of the strap therethrough for engagement by said means for securing the strap to the shaft.

9. In a tool for use in connection with a strap to be drawn into the tool as set forth in claim 8, said registration plate being so slotted transversely of the housing.

10. In a tool for use in connection with a strap to be drawn into the tool as set forth in claim 1, a knife element, a twister head having a slot through which the strap may be passed, means for rotatably positioning the knife element on said housing adjacent the head, and means connecting the shaft and twister head for rotation of the twister head on rotation of the shaft to thereby press the strap against the knife element and cut the strap.

11. In a tool for use in connection with a strap to be drawn into the tool as set forth in claim 10, said means securing the strap to the shaft comprising a pawl pivotally connected to the shaft.

12. In a tool for use in connection with a strap to be drawn into the tool as set forth in claim 11, spring means engaging the shaft and pawl, urging the pawl toward the strap, to so position the strap on the shaft.

13. In a tool for use in connection with a strap to be drawn into the tool as set forth in claim 1, a pin secured to the shaft and extending therefrom and a cam surface on said cam element engaged by said pin.

14. In a tool for use in connection with a strap to be drawn into the tool as set forth in claim 10, a cutter head said means so connecting the twister head and shaft comprising a plate extended from said twister head and means on the shaft slidably receiving said plate for continued engagement of the plate by the shaft on movement of the shaft relative to the cutter head.

15. In a tool for use in connection with a strap to be drawn into the tool as set forth in claim 14, complementary means on the knife blade and twister head for rotary movement thereof in unison.

16. In a tool for use in connection with a strap to be drawn into the tool, a housing, a shaft axially slidably disposed in the housing, a cam member slidably disposed on the shaft, a pin passing through the shaft and extending therefrom in line with one end of the cam member, means for securing the strap to the shaft, and a cam surface on the cam member adapted to rotate the shaft on engagement of the cam member with the pin, and means on the housing engaging the cam member to move the latter into engagement with the pin to rotate the shaft and thus rotate the strap therewith.

17. In a tool for use in connection with a strap to be drawn into the tool as set forth in claim 16, a knife blade, means for freely rotatably mounting the knife blade at the forward end of the housing and for aligning the strap therewith, and means for movement of the strap against the knife blade on rotation of the shaft to cut the strap.

References Cited

UNITED STATES PATENTS

| | | | |
|---|---|---|---|
| 1,795,625 | 3/1931 | Van Slyke | 140—123.5 |
| 3,173,456 | 3/1965 | Barley | 140—123.6 |
| 3,254,680 | 6/1966 | Caveney | 140—93.2 |

WILLIAM J. STEPHENSON, *Primary Examiner.*